July 12, 1949.  E. B. McCARTNEY  2,475,671
LAWN MOWER
Filed Oct. 21, 1944  8 Sheets-Sheet 1

Inventor
E. B. McCartney
By
Paul Paul & Moore
Attorneys.

July 12, 1949.  E. B. McCARTNEY  2,475,671
LAWN MOWER
Filed Oct. 21, 1944  8 Sheets-Sheet 2

Fig-2

Inventor
E. B. McCartney
By Paul, Paul & Moore
Attorneys.

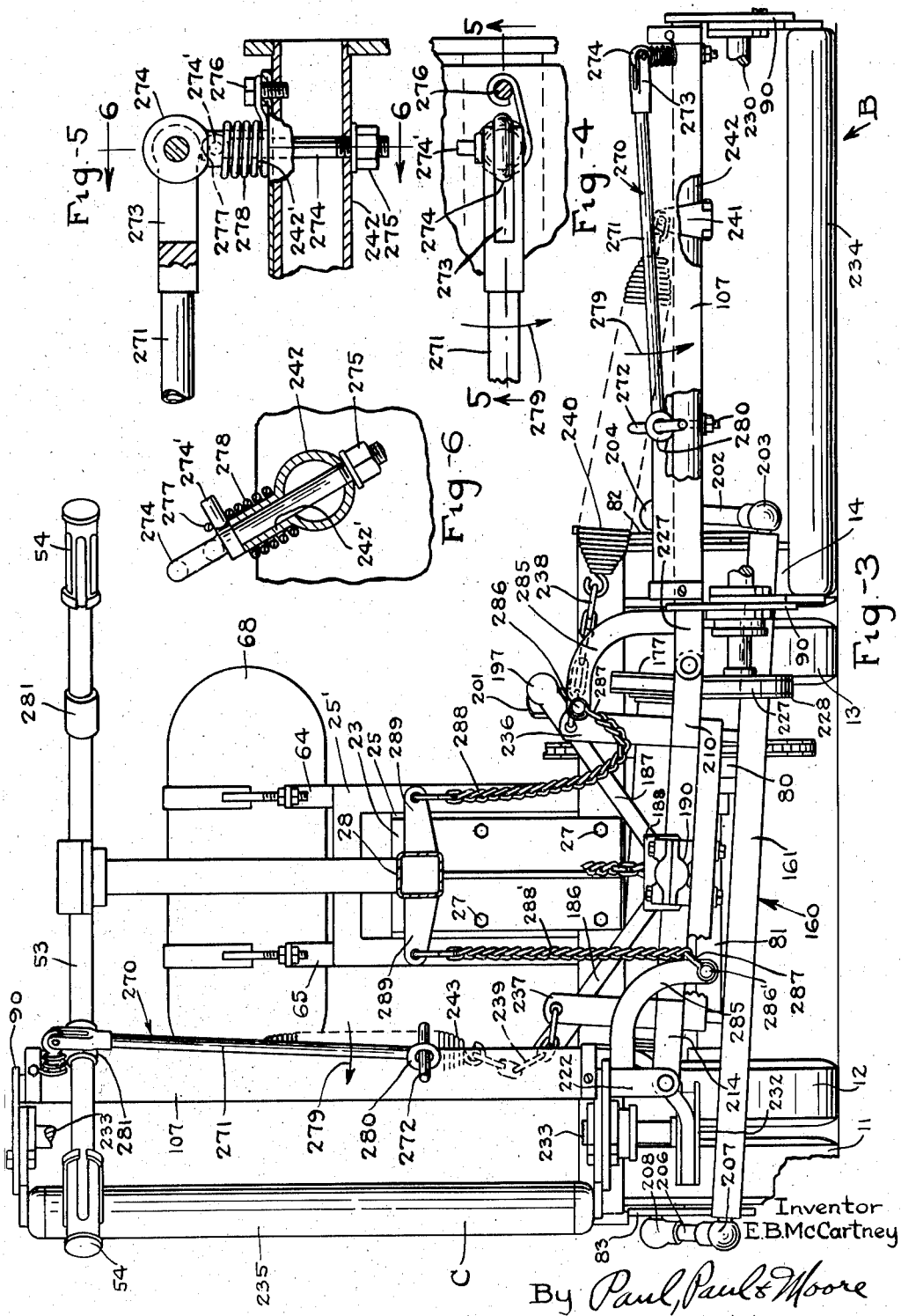

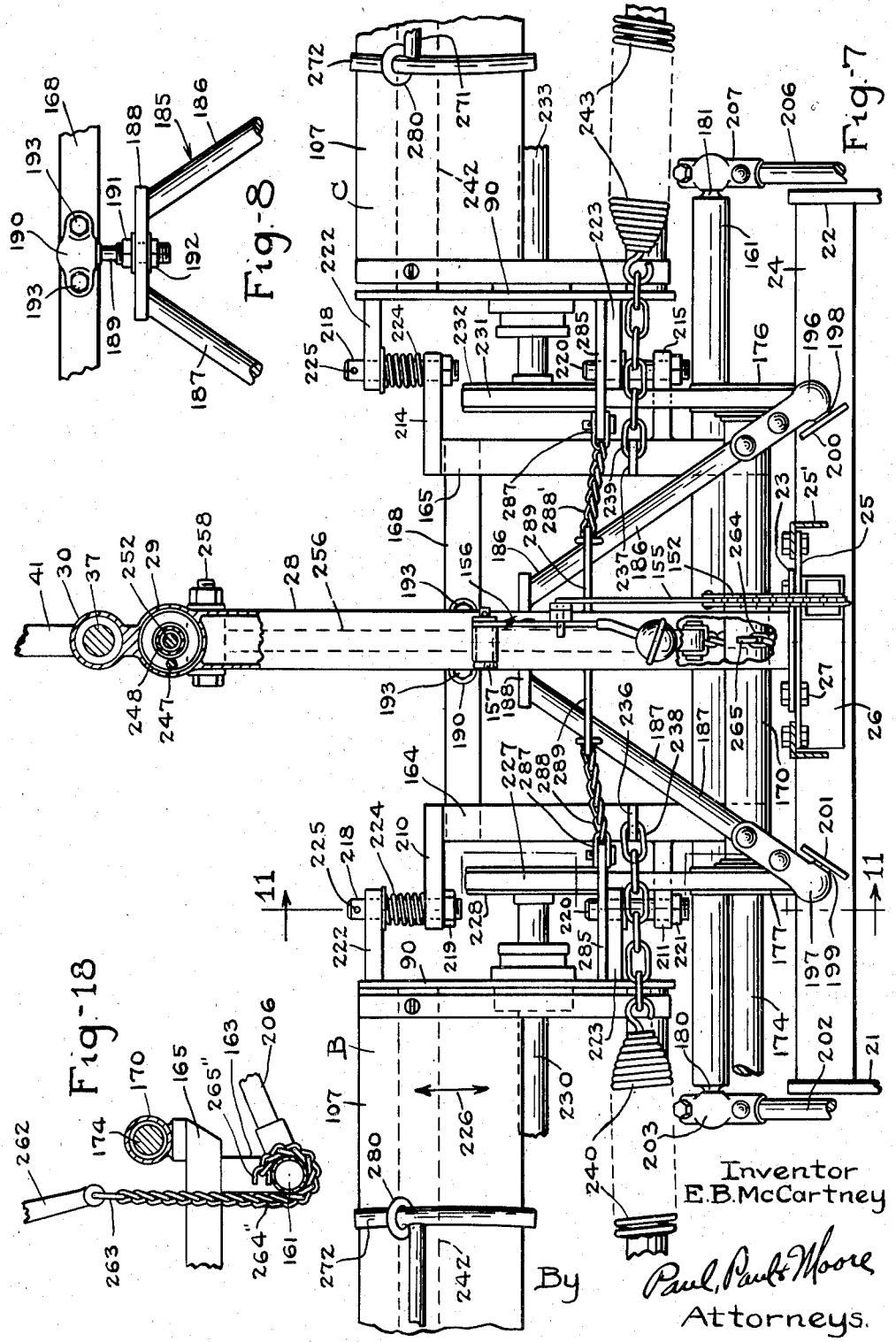

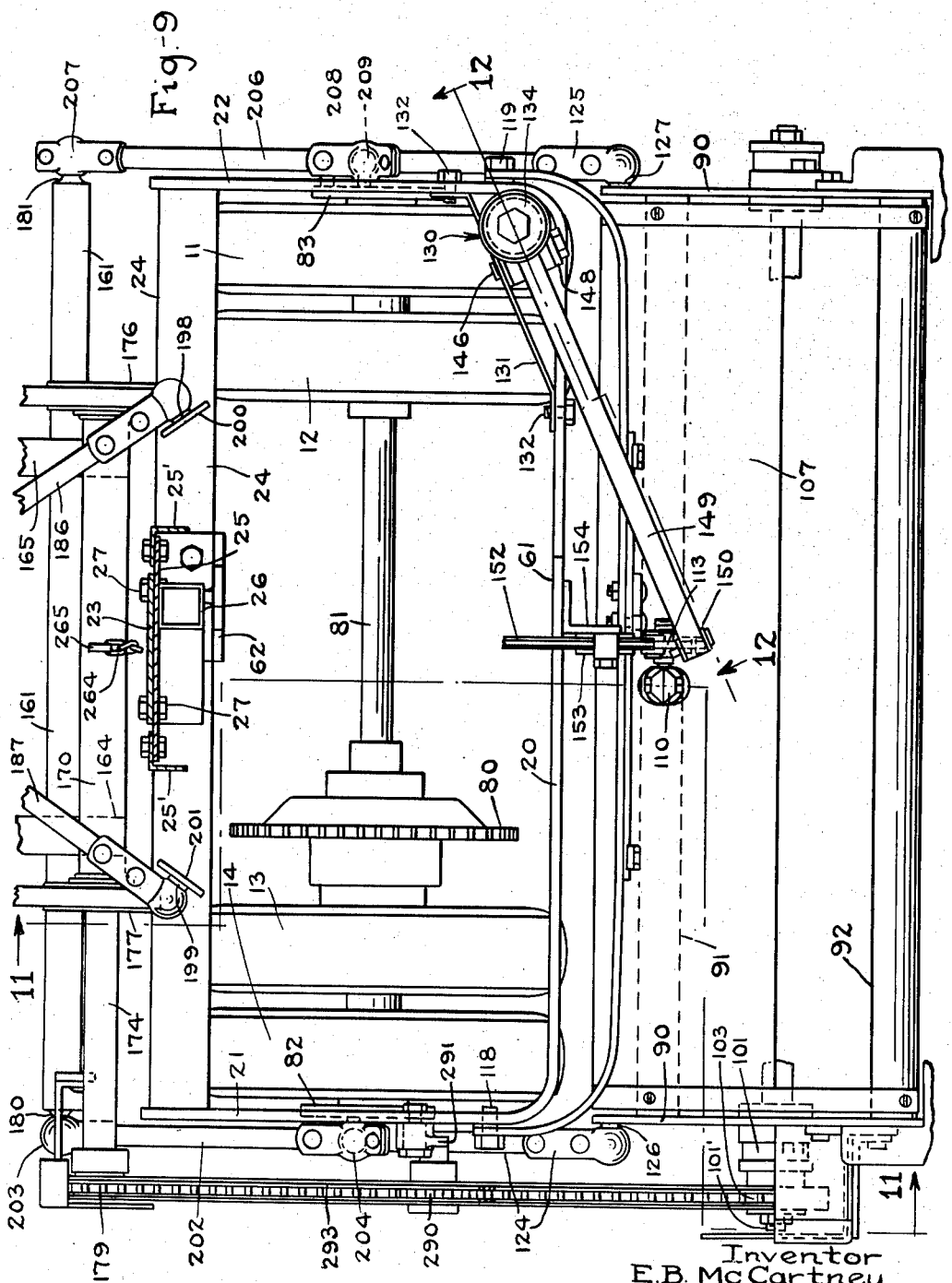

July 12, 1949.  E. B. McCARTNEY  2,475,671
LAWN MOWER
Filed Oct. 21, 1944  8 Sheets-Sheet 7

Inventor
E. B. McCartney
By Paul, Paul & Moore
Attorneys.

July 12, 1949.  E. B. McCARTNEY  2,475,671
LAWN MOWER
Filed Oct. 21, 1944  8 Sheets-Sheet 8
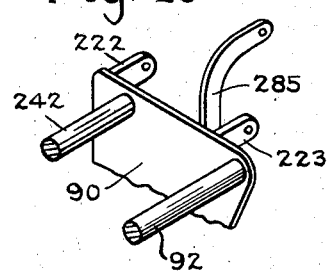
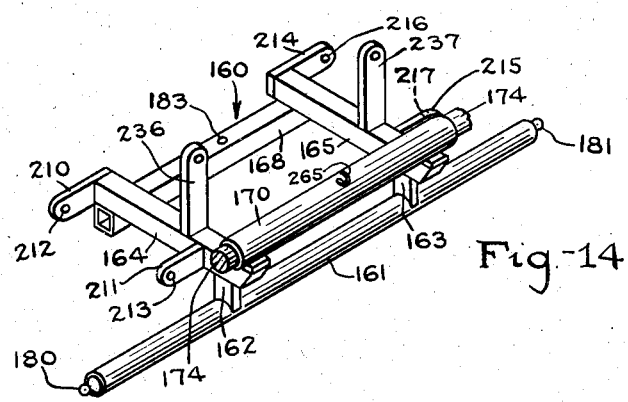
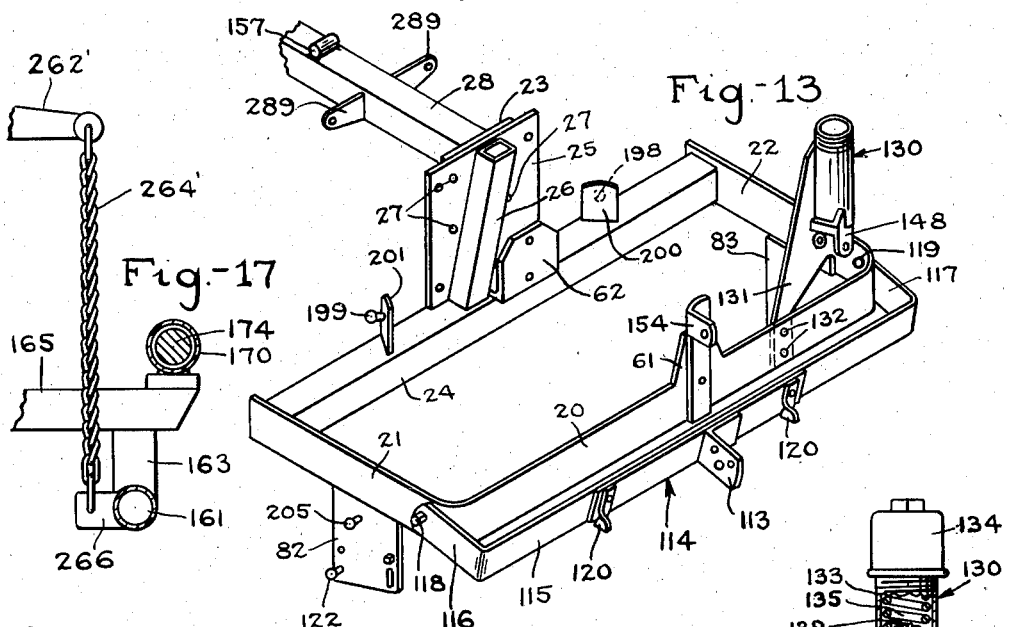
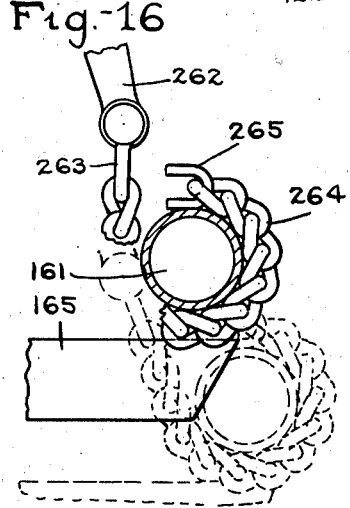
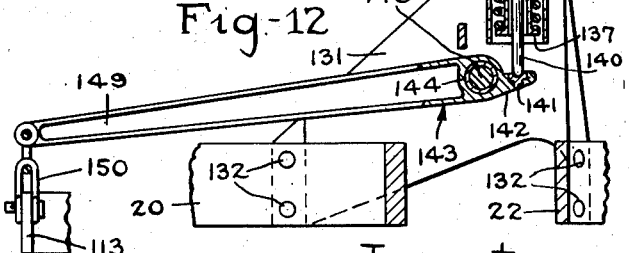
Inventor
E. B. McCartney
By Paul, Paul & Moore
Attorneys.

Patented July 12, 1949

2,475,671

UNITED STATES PATENT OFFICE 2,475,671

LAWN MOWER

Elmer B. McCartney, Minneapolis, Minn., assignor to Toro Manufacturing Corporation of Minnesota, Minneapolis, Minn., a corporation of Minnesota Application October 21, 1944, Serial No. 559,698

13 Claims. (Cl. 56—7)

This invention relates to improved mowing machines and particularly to mowing machines wherein the mowing unit or units are carried by and articulated on a small and compact traction vehicle, and power for operating the rotary reel or other cutting element is supplied to the mowing unit or units from said vehicle. This invention has particular applicability to mowing machines of the type described in Patent 2,299,859, issued October 27, 1942, to Ralph W. Speiser, and is an improvement of machines of that type.

In mowing machines of the type shown in said Speiser Patent 2,299,859, the weight of the individual mowing units is largely carried by the traction vehicle. Each mowing unit has a ground roller or skid which carries a small fraction of the weight of the unit, but most of the weight is transferred to the traction vehicle, and since each mowing unit must be articulated for up and down movement of the unit with reference to the traction vehicle, there are provided direct acting springs which support the front mower unit, the two rear units being mounted upon an articulated sub-frame which is likewise spring-supported by the traction vehicle.

It is an object of the present invention to provide a more uniform lifting force between the traction vehicle and the mowing units to the end that they may provide uniform ground pressure via the ground roller of each unit under all conditions of operation, and so avoid skipping, bouncing, uneven contact and other types of malfunctioning even at high speeds over irregular terrain.

It is also an object of the invention to provide a lifting device for each side mower unit, capable of being operated from the seat of the machine, and capable of locking the side units in vertical position for transportation, trimming or the like.

It is also an object of the invention to provide an automatic sub-frame lift whereby the entire sub-frame is hoisted when the side mower units are elevated.

Other and further objects of the invention include the provision of a separable main frame, affording manufacturing economies and adaptability to varying installations; automatic belt tension release in the drive between sub-frame jack-shaft so as to allow lifting of the side mowers without removal of the reel-shaft drive belts, and the provision of an improved articulated support of the sub-frame and front mower unit so as to overcome all tendency of the wing mowers to lift at one side or maintain uneven contact at high speeds.

Other and further objects of the invention are those inherent in the apparatus illustrated, described and claimed.

The invention is illustrated by the drawings in which

Figure 2 is a front elevational view of the traction unit and front mower, the rear sub-frame and wing mowers being removed;

Figure 3 is a rear elevational view of the traction unit, sub-frame and wing mowers, the left wing mower being lifted to transporting position and the right wing mower lowered to cutting position, the front mower not being shown;

Figure 4 is a fragmentary plan view of the wing mower lift handles, with certain parts removed for purposes of clarity of the drawings;

Figure 5 is related to Figure 4 and is a fragmentary side elevation, partly in section, of the wing mower lift handle, the section of this figure being along line 5—5 of Figure 4;

Figure 6 is related to Figures 4 and 5 and is a sectional view taken along the line 6—6 of Figure 5.

Figure 7 is an enlarged fragmentary plan view of the rear portion of the traction vehicle frame, sub-frame and a portion of each wing mower, Figure 9 being a corresponding enlarged fragmentary plan view of the front part of said frame and the front mower;

Figure 8 is a fragmentary plan view of the V-shaped (upper) radius rod mounting of the rear sub-frame;

Figure 10:
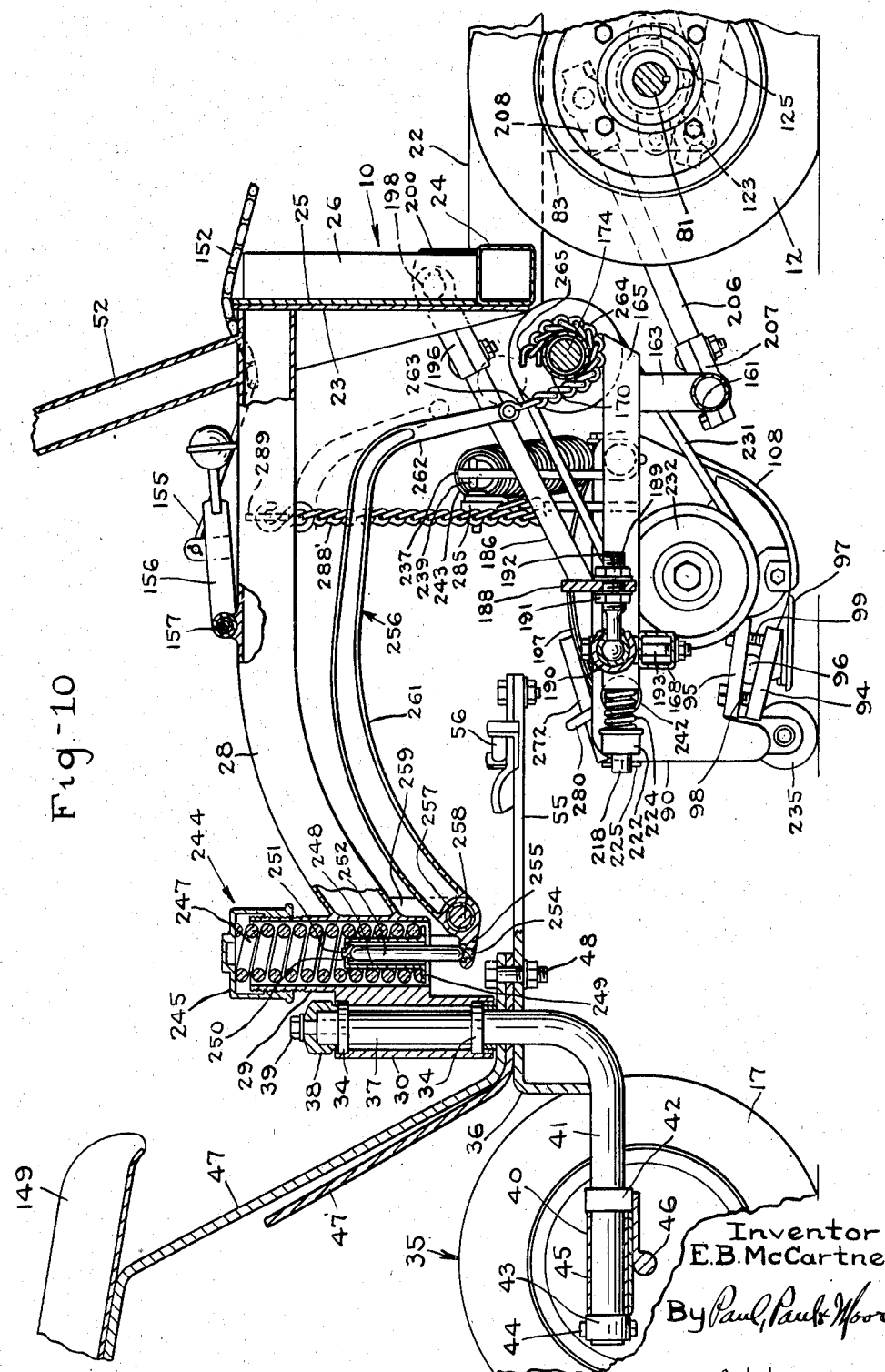
Figure 10 is an enlarged fragmentary side elevational view, partly in section of the rear portion of the traction vehicle, sub-frame and one wing mower, showing particularly the spring support for the sub-frame, taken substantially along the longitudinal of the vehicle.
Figure 11:
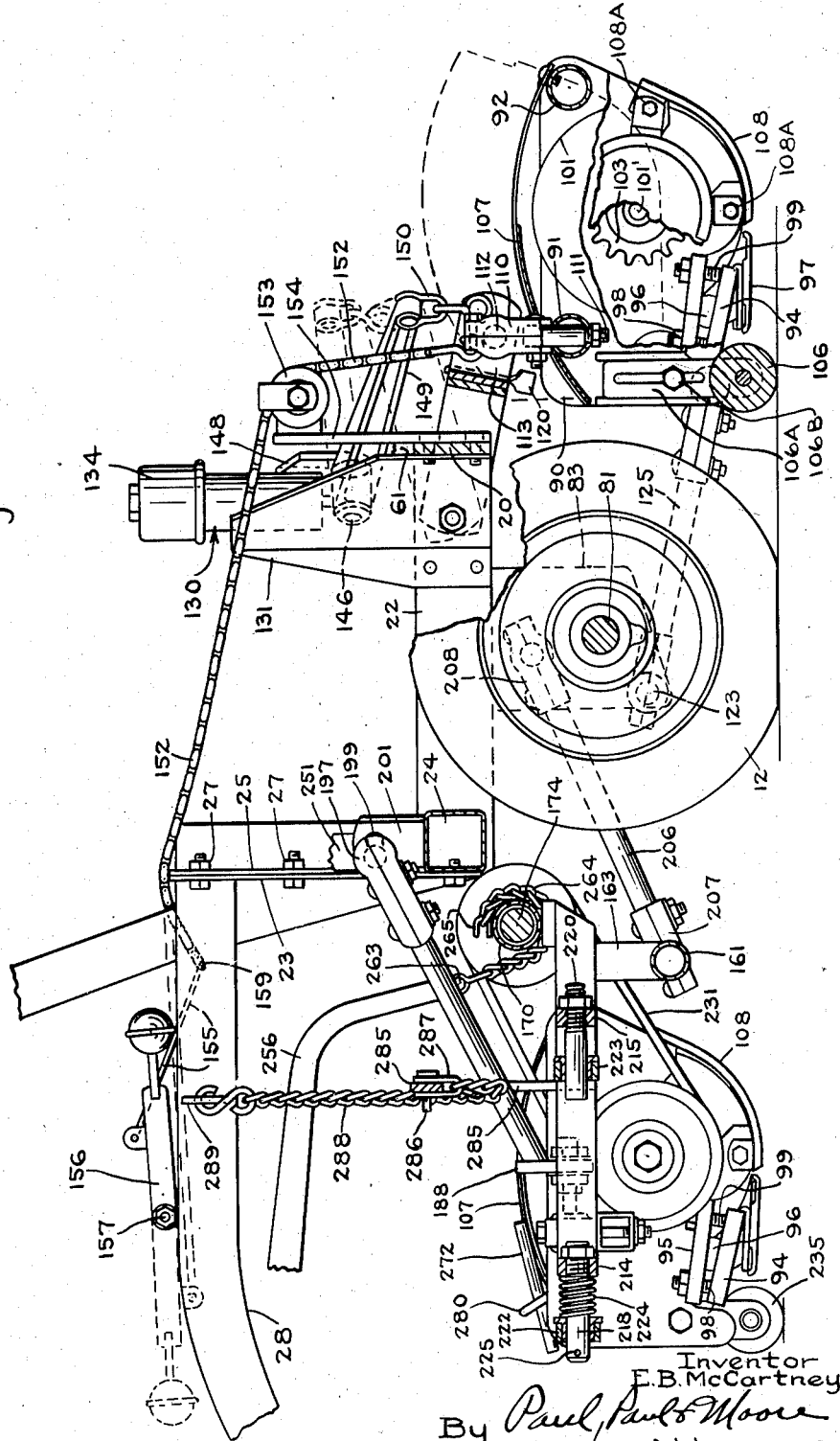

Figure 11 is an enlarged fragmentary side elevational view, partly in section of the forward part of the traction vehicle, showing the sub-frame and one rear (wing) mower and the front mower, taken substantially on lines 11—11 of Figures 7 and 9. Figures 10 and 11 are both taken from the right side of the vehicle;

Figures 13-15 are fragmentary views. Figure 13 is an isometric view of the front part of the mower frame, with most of the apparatus removed therefrom; Figure 14 is a correspondingly sized isometric view of the sub-frame, with the various parts removed therefrom; Figure 15 is a correspondingly sized fragmentary isometric view of the inner end of the right-hand wing mower, as would be connected to the sub-frame of Figure 14.

Figure 12 and Figures 16, 17 and 18 have to do with the spring mower supports. Figure 12 is an enlarged side elevational view in the direction of arrows on line 12—12 of Figure 9, showing the spring support for the front mower. Figure 16 is an enlarged view of the type also shown in Figures 1, 10 and 11. Figures 17 and 18 show two modifications of link hitch between the sub-frame and the spring operated lever arm of the sub-frame lift.

Throughout the drawings, corresponding numerals refer to the same parts.

*Tractor frame and steering structure*

The traction and transport vehicle is a four-wheeled apparatus comprising a frame generally designated 10 having a pair of dual forward driving wheels 11—12 and 13—14 and a trailing set of tandem caster-mounted steering wheels 16 and 17. The main frame structure is best illustrated in Figures 1, 10, 11 and 13. The frame consists of a forward cross piece 20 which is preferably integrally formed with rearwardly extending side pieces 21 and 22. The side pieces 21 and 22 are joined together by a central transverse frame member 24 which is preferably a piece of square steel tubing attached to the side pieces 21 and 22. At the middle of the central transverse frame member 24 there is an upstanding gusset plate 25 which is strongly braced by the member 26. To the gusset plate 25 there is bolted a detachable plate 23 which is held in place by bolts 27 and to the detachable plate there is attached a rearwardly extending central frame member 28 which is likewise preferably of square tubular cross section. The central frame member 28 is curved downwardly at its rear end and terminates on a spring housing 29 which is formed integrally with a vertical pivot post 30, the latter serving as a coupling for the caster type trailing bogie unit 35. The provision of the separable joint at plates 23 and 25 is especially helpful in reducing manufacturing costs, since the jigs for welding are much simpler. Furthermore, the provision of a separable joint at this point allows the front and rear frame pieces to be divided and re-combined with other units in other combinations. Thus, a simple single-mowing unit mower may be substituted for the multiple-mowing unit mower here shown.

The trailing steering bogie unit generally designated 35 consists of a central frame 36 having a forwardly positioned and upwardly extending pivot pin 37 which is received in the pivot post 30 (see Figure 10). The pivot pin 37 is received in ball-bearing units 34—34 and is provided with a cap 38 which is held in place by cap screw 39.

The pivot shaft 37 is bent at right angles and extends rearwardly so as to form a mounting upon which an axle unit 40 is attached. The mounting shaft 41 is provided with a permanently fastened collar 42 and a removable collar 43 that is held in place by bolt 44. Upon the mounting shaft 41 there is placed a tubular member 45 which is held in the shaft by the collar 43 and to the tubular member 45 there is permanently attached an axle 46 upon which the wheels 16 and 17 are attached in customary fashion. In this way the pair of wheels 16 and 17 are free to rock about the shaft 41 in conformance with irregular terrain. Extending above the frame 36 there is a seat spring 47 having an under-leaf 47', the springs 47 and 47' being held in place by being apertured and passed over the post 37 and then clamped by the through bolt 48. At the upper end of spring member 47 there is an operator seat 149.

Extending upwardly from the central frame member 28 there is a fixed steering column 52 upon which rearwardly extending handle bars 53 are fixedly mounted. The handle bars are equipped with handle grips 54. From the frame member 36 of the bogie truck there is a forwardly extending foot rest frame 55 upon which foot pieces 56 are adapted to be mounted. Steering of the trailing bogie unit 35 with respect to the frame 10 is accomplished by the reaction of the operator's hand upon the steering grips 54. Hence, as the vehicle proceeds, steering is accomplished by the operator swinging the seat 49 and hence the unit 35 to the right or to the left. Since the operator seat 49 is farther away from the pivot post 30 than the wheels 16—17, the reactive steering force of the operator upon the seat 49 is to some extent multiplied and easy steering is accomplished.

*Power source and power transmission*

At the forward part of the main frame there is mounted a power source generally designated 60, this being preferably a one or two cylinder air cooled gasoline engine having an integral speed reduction gear. The engine is carried between the forward bracket 61 which is at the middle of the forward cross piece 20 of the frame, Figure 13, and a rear engine bracket 62, carried on the cross frame member 24. The gusset plate 25 serves to support a sub-assembly of vertical posts 25', Figures 1-3, having semi-circular upper portions 64 and 65 upon which gasoline tank and tool hatch 68 of the engine are mounted.

The drive shaft of the engine is at the right-hand side of the unit, the drive shaft being indicated at 70, Figure 2. Upon the drive shaft there is mounted a reverse gear generally designated 71 of any conventional type, the driven or output side of the gear being the chain sprocket 73. The reverse mechanism illustrated has forward, neutral and reverse conditions of operation which may be selectively attained by means of the gear shifting lever 75 connected by link 76, bell crank 77 and link 78. The forward and reverse transmission and the controls therefor may conveniently be of the type illustrated in Speiser Patent 2,299,859, of which the present invention is an improvement. The drive mechanism need not therefore be further described, it being sufficient to note that the drive sprocket 73 may be caused to operate in the forward or reverse direction at will, so as to propel the chain 74.

The chain 74 extends over the driving sprocket of a differential gear 80 mounted upon shaft 81 which is journaled in the frame side members 82 and 83, Figure 13. The dual wheels 11—12 and 13—14 are mounted on shaft 81 and hence the transmission vehicle may be propelled forwardly or backwardly as desired, steering being accomplished as previously described by means of the movement of the trailing bogie 35.

The engine drive shaft 70 extends outwardly upon the gear box 71 where it is supported by a bearing post 84, and on the overhanging end of the shaft 70 there is positioned a drive sprocket 85 which is driven through a clutch mechanism generally designated 87. The clutch mechanism may conveniently be of the type illustrated in Speiser Patent 2,299,859 and controlled as therein illustrated so as to provide for rotation of the drive sprocket 85 at the will of the operator. The drive sprocket 85 serves to rotate the rotary reels or other cutting elements of the mowing units hereinafter described.

Mowing unit A

About the main drive vehicle there are positioned three (3) mower units generally designated A, B and C. The mower units are of generally similar construction except so far as the power drive connection units are concerned, units B and C being an enantiomorphic pair, otherwise identical. The mower units are preferably of the type shown in Speiser Patent No. 2,372,300 issued March 27, 1945. Since the mowing units are substantially identical except for their mountings and the position of their drive sprockets, only one need be described.

Each of the mowing units consists of side frame plates 90 which are connected together by two or more intermediate frame members 91 and 92 and by the knife bar 93. The frame members 91 and 92 are preferably of tubular steel and are attached solidly to the side plates 90. The knife bar 93 is preferably made of steel plate, grooved and bent along the groove so as to close the grooves and form a V-shaped bar, as illustrated in Speiser Patent No. 2,372,300. The ends of the knife bar terminate in plates 94 and the side plates of the lower unit frame are provided with corresponding overlying plates 95 which are solidly welded to the side frame members 90. Each of the members 95 (on each of the mower side plates 90) is milled by means of a rotary cutter on its under side and the upper surface of the plates 94 extending from the ends of the knife bar are similarly milled to receive a solid disc of steel 96. Screws 98 and 99 pass through the members 95 on the side plates and are threaded into the overlying members 94 on the knife bar, thereby clamping the two plates 94 and 95 upon the circular disc 96. The disc completely prevents endwise movement of the knife bar with respect to the side plates, and yet the knife bar is rotatable about the axis of disc 96 as a center for adjustment of the bed knife 97. The mower unit is provided with multiple-blade rotary reel 100 which is journaled in bearing blocks 101 and 102 as illustrated in Speiser Patent No. 2,372,300. The reel shaft 100' extends at the right hand side of mower units A and C and at the left-hand side of mower unit B. Upon the extending ends of the reel shaft of each mower there is provided a drive sprocket or V-belt pulley, the sprocket 103 being illustrated for mower unit A. If desired, the drive sprocket (or V-belt pulley) may be provided with a built-in overload clutch, as described in Patent No. 2,372,300 so as to provide for slippage of the reel with respect to the drive in the event the rotary reel encounters an obstruction.

The mower unit A is provided with a ground roller as illustrated at 106 which is preferably made adjustable in the vertical direction by means of slotted bearing support plates 106A attached to the mower side frames by bolts 106B as illustrated in Figure 11, and is provided with a shield 107 over the rotary reel and with front side guards 108. The latter serve to protect the forward portion of the rotary reel against flying stones and the like. The guard 108 is attached by means of bolts 108A and is conveniently removable.

Mower unit A is attached to the frame by means of a three-point articulated parallel linkage. The upper central point of connection is a ball and socket joint 110 at the upper central part of mower unit A. The ball joint socket 110 is attached to the mower cross frame member by means of a bolt 111, Figure 2, and into the socket 110 there extends a ball 112 that is carried upon a forward tongue 113 of the U-shaped frame generally designated 114. The U-frame has a front forward piece 115 and is bent so as to provide parallel rearwardly extending side arms 116 and 117 that are pivoted to the side frame pieces 21 and 22 of the vehicle frame by means of bolts 118 and 119. Upon the front forward piece 115 there are provided a pair of adjustably mounted limit stops 120 that are positioned so as to engage upon the rear portion of the shield 107 of the mower unit when the mower unit is elevated to its uppermost position, as hereinafter described.

Each of the downwardly extending members 82 and 83 of the main frame, Figure 13, is provided with ball pivots 122 and 123, which serve as points of attachment for the socket ends of the side radius rods 124 and 125. The front ends of these rods are fastened to the ball joints 126 and 127, Figure 9, on the side frames 90 of the mower unit A. The radius rods 124 are preferably tubular and are provided at each end with rubber-lined ball sockets in which the ball joints are clasped, as illustrated by the rubber lined socket 190, Figure 10.

The weight of the mower unit A is carried by means of a spring mounting device generally designated 130, Figures 2, 9, 11, 12 and 13 which consists of an angularly bent bracket 131 fastened to the traction vehicle frame members 20 and 22 by means of rivets or bolts 132. To the frame 130 there is welded a vertical link of pipe 133 which is screw threaded for a considerable distance at its upper end to receive a corresponding threaded cap 134. Within the pipe 133 there is a coiled compression spring 135 which is forced against the under side of cap 134. At the lower end of the spring 135 there is provided a thimble 136 having a lower flange 137 which rests against the bottom end of the spring. The thimble has a diameter such that it extends freely into the spring 135 and is inwardly flanged at its upper end to receive and hold the hardened steel button 138 which is centered in the thimble and held by the tip 139 of the button passing through a hole in the top of the thimble. Against the button 138 there projects a post 140 or column which is rounded at its upper and lower ends and is suitably hardened. The bottom end of the post is positioned in a hardened steel button 141 that is set in the short end 142 of a lever generally designated 143. The lever 143 is journaled on needle bearings 144 on a shaft 146 that extends from the bracket 131 to an outer brace 148 that is welded to the lower end of pipe 133. The shaft 146 is so positioned that the lever arm 143 extends at an angle, Figure 9, so that its long end 149 terminates practically above the outer end of tongue 113 on the U-shaped mower mounting frame 114. A pair of clevis links coupled together as illustrated at 150 serve to connect the long end 149 of the lever 143 to the tongue 113. The screw cap 134 on the spring mounting, Figure 12, is deep and is threaded throughout a sufficient length that it can be screwed down or up to adjust the compression of spring 135 and hence the lifting force exerted through the clevis coupling 150 upon tongue 113. In this way any desired fraction of the weight of the mower unit A may be transferred to the spring lift 130, a small portion of the weight of the mower unit being supported upon the ground roller 106. The amount of weight on the ground roller is sufficient that the mower unit does not bounce but readily follows the undulations of the turf over which the machine is propelled. It may be pointed out that the mower unit A has freedom of translatory movement in the vertical manner and also has a limited tipping movement from side to side due to the three-point ball connection afforded by the U-shaped frame 114 and the radius rods 124 and 125.

To the tongue 113 there is attached a link chain 152 which passes over pulley 153 that is mounted upon a bracket 154 attached to the bracket 61 on the vehicle frame. The chain 152 extends rearwardly and over the frame members 23 and 25 and thence through link 155 to lever 156 that is pivoted at 157 upon the rearwardly extending frame member 28. The lever 156 may be swung from the forward position shown in full lines in Figure 11 in which the chain 152 is slack and hangs down as illustrated at 159 to the dotted line position likewise illustrated in Figure 11. When in the dotted line position the link 155 and chain 152 are pulled taut and mower unit A is lifted to the dotted line position. In this position the mower unit is elevated well above grass-cutting position. It may be noted parenthetically that the lever 156 is self-locking in the central position shown in dotted lines in Figure 11 and therefore does not require a catch or detent.

Mower units B and C

The lateral mower units B and C are not coupled directly to the traction and transport vehicle but are instead carried by a sub-frame member generally designated 160, the details of which are best illustrated in Figure 14. The sub-frame member consists of a front tubular bar 161 having upright pieces 162 and 163 attached thereto, at the upper ends of which there are attached side pieces 164 and 165 which are preferably made of square steel tubing. An intermediate frame piece 168 is attached to the rearwardly extending ends of the side frames 164 and 165 which serves to stiffen the unit. Upon the front upper portion of the side pieces 164 and 165 there is attached a tube 170 which not only serves as a frame member but also serves as means for supporting a pair of journals one in each end of the tube in which the sub-frame counter-shaft 174 is rotatably mounted. The shaft 174 carries a pair of V-type pulleys 176 and 177 and the one end carries a chain sprocket shown in the dotted lines at 179, Figure 1. The sprocket is positioned so as to be in alignment with the chain drive sprocket 85 on shaft 70.

The outer ends of the tubular member 161 are provided with ball joints 180 and 181, and at the middle of the rear cross frame member 168 there are holes 183 to which a ball joint socket is fastened, as hereinafter described. The sub-frame assembly 160 is supported by means of a three-point suspension as follows:

The upper rear-center support for the sub-frame 160 is provided by a V-shaped radius rod generally designated 185, Figures 7 and 8, consisting of two tubular members 186 and 187 that are welded to a rear plate 188. At the center of the plate there is a rearwardly extending shaft 189 terminating in a ball that is fitted into a ball socket 190. The shaft 189, Figure 8, is provided with screw threads and is held to the plate 188 by a pair of nuts 191 and 192 which allow for fore and aft adjustment of the pivot 189 and for the ball at its end. The ball on the pivot 189 is recessed in the ball socket 190 that is in turn held upon the rear cross frame member 168 by means of the bolts 193. On the front ends of each of the tubular members 186 and 187 there are ball sockets 196 and 197, respectively, into which there are received a pair of ball joints 198 and 199 mounted upon the upstanding angularly disposed brackets 200 and 201 on member 24, Figures 7, 8 and 13.

Figure 1:
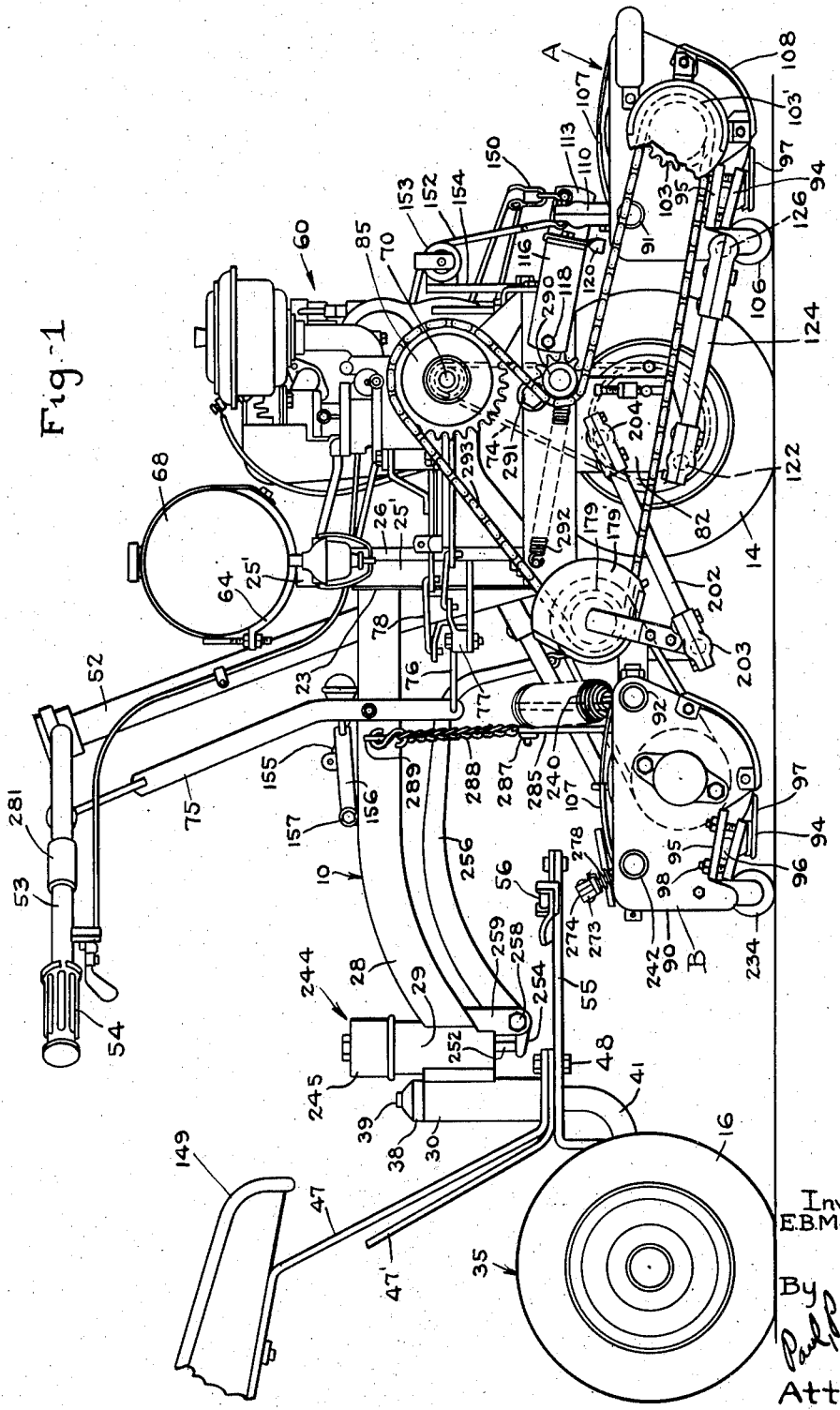
Figure 1 is a side elevational view.

To the ball joint 180 at the front right-hand side of the sub-frame 160 there is attached a lower radius rod 202, Figures 1, 3 and 7, which is provided at each end with a ball socket as indicated at 203 and 204. The socket 203 is clamped upon ball joint 180 of the sub-frame, and the socket 204 is clamped upon a ball joint 205, Figure 13, on the downwardly extending frame member 82 of the transport vehicle frame. In the same manner the left-hand ball 181 on the cross frame member 161 of the sub-frame is recessed in a ball socket 207 on the rear end of the left-hand radius rod 206. The front end of the left radius rod 206 is likewise provided with a ball socket 208 which receives and is clamped upon the ball 209 in the lift frame piece 83 which extends downwardly from the vehicle frame member 22. It will thus be observed that the sub-frame is provided with a vertical translatory motion by means of the parallel action of the lower radius rods 202 and 206 and the V-shaped upper radius rod 185. At the same time the sub-frame is permitted a limited tipping motion due to the three-point suspension and the ball linkages on the radius rods.

At the right-hand side of the sub-frame 160, Figure 14, there are sidewardly extending mower mounting brackets 210 and 211 which have at their ends aligned threaded apertures 212 and 213 for receiving and supporting mower unit B. The brackets 210 and 211 are welded to the side frame members 164 of the sub-frame. In the same manner from the left-hand side frame member 165 of the sub-frame there extend brackets 214 and 215 which likewise, have aligned apertures at 216 and 217 to receive and support the mower unit C. Since the supports of mower units B and C are similar, only one need be described.

Referring to Figure 7 it will be observed that the bracket 210 is provided with a rearwardly extending stub shaft 218 that is threaded into the aperture in member 210 and is locked in place by means of the nut 219. Similarly the bracket 211 is provided with a rearwardly extending shaft 220 axially aligned with the shaft 218, and likewise threaded into the aperture in the bracket 211 and locked in place by the nut 221. From the inner side plate 90 of mower unit B there extend a pair of brackets 222 and 223 each of which is apertured and bushed, Figure 11, so as to slide onto the stub shafts 218 and 220. The stub shafts are of sufficient length so that space is allowed for the insertion of a spring 224 between the sub-frame bracket 210 and the lower side plate bracket 222. The spring 224 may optionally be included between the sub-frame side bracket 211 and the lower side plate bracket 223 if desired, or springs may be included at both places. A cotter pin which limits the rearward motion of the mower unit B on the stub shafts 218 and 220 is provided at the rear end of shaft 218 as indicated at 225. The effect of this mounting is to permit the mower unit B to slide back and forth as indicated by the double arrow 226 so as to maintain uniform tension on the V-belt 227. Belt 227 runs over V-belt pulley 177 of the sub-frame counter-shaft to the V-belt pulley 228 on the reel shaft 230 of mower unit B. Mower unit B swings up and down in a vertical plane perpendicular to the axis of shafts 218 and 220 in conformance with ground irregularities and in so doing would cause an irregular belt tension upon the V-belt 227 were not the sliding of the mower unit B permitted. As it is, the spring 224 maintains the belt tension constant; the mower unit slides back and forth on pins 218 and 220. The top of the V-belt pulley 228 is substantially level with the axis of stub shafts 218 and 220 and the bottom of the driving pulley 177 on the sub-frame is likewise so aligned. By this alignment satisfactory power transmission from the sub-frame to the reel shaft is insured as explained in detail in Speiser Patent 2,299,859, even though the mower unit is swung to the vertical position. It may be noted parenthetically that in the Speiser Patent 2,299,859 the belts driving the wing mower were taken off when the wing mower units are lifted inasmuch as an automatic belt tensioning device is not there included. By including the automatic belt tensioning device of the present invention, it is possible to have rotation of the swing mower unit reels even when they are in the vertical position, for hedge trimming etc. The mounting of wing mower C is similar to that for wing mower B and power is transferred thereto from pulley 176 through V-belt 231 to the V-belt pulley 232 on the reel shaft 233 of the mower unit C in the same manner as described with reference to mower unit B.

Each of the wing mowers B and C is provided with a ground roller as illustrated at 234 for mower unit B and 235 for mower unit C and the ground roller serves to support a small fraction of the weight of the unit. A major portion of the weight of the wing mower units is transferred to the sub-frame by a spring suspension generally designated 244 as follows:

On the sub-frame there are provided upstanding brackets 236 and 237 as illustrated in Figures 3 and 14, which are apertured at the top to receive chains 238 and 239 respectively. The chain 238 is coupled to a spring 240, the outer end of which is in turn coupled to bracket 241 on the cross frame member 242 of mower unit B. Similarly, the chain 239 is coupled to a spring 243 which is in turn coupled to mower unit C. In this manner, when the mower units B and C are in the down position, a portion of their weight is transferred to the brackets 236 and 237 and from the brackets to the sub-frame. An additional part of the weight is transferred through the pivotal mountings afforded by the stub shafts 218 and 220 of mower unit B and the corresponding stub shaft mountings for mower unit C.

The weight of the combined unit consisting of the sub-frame 160 and mower units B and C, except for the small fraction of the weight carried by the ground rollers 234 and 235 of the mower units, is carried by means of spring and lever linkages best illustrated in Figure 10. This linkage is similar to the unit 130 described with reference to the front mower A and consists of a tube 29 which is formed integrally with the frame member 28 of the machine. The tube 29 is threaded at its upper end and is provided with a cap 245 and serves to form an abutment for the upper end of a compression spring 247. The spring is forced upwardly by means of a thimble 248 having outwardly extending flange 249 which bears against the lower part of the spring. The diameter of the thimble is such that it clears the internal diameter of the spring 245 and the thimble is closed at its upper end except for a hole 250 which serves to locate a hardened steel bearing button 251. The post 252 is rounded at both ends and the upper end is forced against button 251, the lower end being seated in a corresponding hardened steel button 254 which is located in the short end 255 of a lever generally designated 256. The lever is supported on needle bearings 257 which are in turn mounted upon shaft 258, the shaft being carried by downwardly extending frame pieces 259 that are formed integrally with the frame member 28 of the traction vehicle. The lever 256 is preferably curved upwardly at 261 so as to provide clearance for the operator's feet on the foot rest 55—56 and is then curved downwardly at 262 and terminates in the clevis bolt 263. A chain 264 is attached to the clevis 263 and is wrapped around the tubular frame member 170 of the sub-frame where it is hooked at 265. It will be noted that in the full line position shown in Figure 10, which represents a low position, the direction of pull on chain 264 is slanting, rather than vertical, whereas when the lever 256 is in its uppermost position as indicated by the dotted lines, the sub-frame 160 has moved arcuately due to the length and position of radius rods 202 and 206 and the radius rods 185, until the member 170 is in such a position that the chain 264 is nearly vertical. This change from slanting pull to vertical pull from low to high positions serves to compensate for the decrease in the force of the spring 247 from the low to the high position. When the spring force is least the pull is direct, when the spring pull is most, the pull is at an angle and is therefore compensated.

A modified form of connection link between the end 262' of the lever 256 and the sub-frame 160 is illustrated in Figure 17. In this modification the lever 256 is terminated at its straight portion and the chain 264' is connected to a protuberance 266 which is welded to and extends backwardly from the sub-frame cross member 161. This form of connection may be utilized wherever it is desired to centralize the lifting force imposed by the lever 256 in respect to the weight of the sub-frame and mower assembly so as to minimize any tendency of the sub-frame 160 to be tipped by the lifting force of chain 264'.

A further modified form of connection is illustrated in Figure 18 wherein the lever 262 is connected by the nearly vertical chain 264" which is extended straight downwardly and wrapped around the sub-frame cross member 161 and hooked, as indicated at the hook 265".

The form of lifting device illustrated at 130 for mower unit A and the similar lifting device 244 for the wing mower units B and C and sub-frame 160, provides a much more uniform lift of the mower units as compared with the apparatus illustrated in Speiser Patent 2,299,859, due to the multiplying effect of the lever 143 (for mower unit A) and lever 256 (for mower units B and C). The force multiplication of the levers provides a uniformity of spring force equivalent to that afforded by a direct acting spring 25 or 26 feet in length, and therefore throughout the range of up and down movement of the mower units, the lifting force thereon is substantially uniform. This permits a uniform ground pressure on the ground rolls of the mower units and obviates bouncing even at high speeds of operation.

The lifting of wing mower units B and C from the driver's seat and the lifting of the sub-frame concurrently with the upward swinging movement of the mower units B and C is provided by the apparatus best illustrated in Figures 3-6. On each of the mower units B and C, there are mounted operator reach handles generally designated 270 which are identical. The reach handle consists of a rod 271 formed with a T-shaped hand grip 272 at its outer end, the hand grip part 272 being curved to follow a segment of a circle having a radius equal to the length of the handle to its pivotal mounting. The rod 271 terminates in a clevis 273 which is pivotally mounted upon the eye bolt 274, thereby allowing the handle 271 to be swung toward or away from the body of the mower unit. The eye bolt 274 is in turn pivotally mounted in the mower cross frame member 242 and is held in place by means of nut 275. The mower cross frame member is provided with a tubular side extension 242', as shown in Figure 6, so as to provide adequate bearing support for the eye bolt 274 which therefore neatly rotates in the journal formed at 242'. A torsion spring 278 of a diameter such that it loosely circumscribes the tubular side piece 242', and after several turns therearound, one end of the spring is solidly fastened by means of the stud 276. The opposite end of the spring is curved as illustrated at 277 so as to wrap around the side nib 274' of the eye bolt. The torsion spring 278 is so tensioned as to cause the reach handle 270 to be urged in the direction of arrow 279. In line with the hand grip 272 of the reach handle there is provided a second eye bolt 280 which is likewise bolted through the mower unit cross frame member 242. In mowing position it is desired to have the reach handle 270 out of the way and solidly locked to the mower unit B. This is accomplished by the operator who arranges the handle 270 so that the end of the hand piece 272 enters through the eye of bolt 280 where it is held due to the torque of spring 278. When it is desired to lift the mower unit B, the operator may do so from his seat, by reaching down and releasing handle 270 from the eye bolt 280 and by pulling on the handle to raise the mower unit B to the position shown for mower unit C in Figure 3. When in this position the sub-frame 160 is elevated as hereinafter described, to a position such that the eye bolt 274 just clears the rubber pad 281 on the steering handle 53 and by swinging the handle 271 downwardly, as shown for mower unit C, and by locking the hand grip portion 272 into the eye bolt 280, the mower unit is locked in place and held immovable. Either mower unit B or C may be lifted in a similar manner and locked in place against the fixed handle bar 53.

The lifting of the sub-frame 160 and the mower units B and C to a uniform elevation during transporting condition is accomplished by means of a curved arm 285 that is attached to the mower side plate 90, as shown in Figures 3 and 15. The arm 285 extends upwardly and across the line of the mower unit pivot pins 218 and 220 and terminates in an apertured end 286 to which a clevise 287 and chain 288 are attached. When in the mowing position, as illustrated for mower unit B (Figure 3), the chain 288 is slack, the upper end being fastened to a side arm 289 extending from the central frame member 28 of the traction unit. When the wing mower unit is elevated by the operator, as illustrated for mower unit C, the initial elevating movement serves to take up the slack in the chain 288 until it reaches the position shown at 288' for mower unit C. Thereafter additional swinging movement of the mower unit upward to the position shown for mower unit C does not change the elevation of the aperture at the end of arm 285 (illustrated at 286' for mower unit C) and the reaction force accordingly elevates the mower unit C and with it the end of the sub-frame 160 attached thereto. This insures accurate positioning of the mower unit C with reference to the handle bar 53 so as to allow easy locking of the mower unit into transporting position. When both wing mower units B and C are elevated the entire sub-frame is level and is at the height shown at the left end in Figure 3.

*Power drive for the mower units*

The front mower unit A is provided with a sprocket 103 as previously described, which is aligned with the sprocket 85 on the motor power shaft. An aligned idler sprocket 290 is provided as shown in Figure 1 and is mounted on a pivot arm 291 that is normally pulled backwardly by means of the spring 292 so as to maintain uniform driving tension on the drive chain 293 which passes over the sprockets 85, idler 290 and the front mower sprocket 103. The chain also passes over a drive sprocket 179 on shaft 174 of the sub-frame. The front mower sprocket 103 is preferably provided with a guard housing 103' and the sub-frame sprocket 179 likewise provided with a housing 179' so as to guard against damage due to flying dirt, stones, and the like. The operation of the motor 60 therefore serves directly to drive the rotary cutting reel of mower unit A and serves to rotate the shaft 174 on sub-frame 160 and through V-belt pulleys 176 and 177 on the sub-frame counter-shaft and V-belts 227 and 231 power is supplied to the reel shafts 230 and 233 of wing mower units B and C respectively. The drive to the three reel shafts may be interrupted at will by declutching the clutch 87.

Referring to Figures 7, 9 and 14 it will be noted that shaft 174 extends to the right-hand side of the mower, and this extending end of the shaft, together with sprocket 179 and guard 179', Figure 1, constitute an unbalancing weight so that the complete sub-frame is not balanced about its longitudinal center line. This tends to cause the sub-frame 160 to ride low at its right-hand side, a tendency which is accentuated by the forces on drive chain 293, Figure 1. As to the latter it has been discovered that the normal chain tightening tension imposed by spring 292 and pulley 290 is an additive force which adds to the force in that portion of the chain between sprockets 179 and 103 and also to that portion between sprockets 179 and 85, but percentagewise adds more to the former than to the latter. This also causes sprocket 179 to be pulled downward and the entire sub-frame 160 to move downward at the right end. To compensate this action, the ball support 204 is lowered below the position through which resultant of the chain pull forces acts and consequently there is produced an actual lift on the sprocket 179. This compensates for the extra weight at the right end of the sub-frame. Level operation of the sub-frame and uniform following of ground contours by the wing mowers is therefore assured under all conditions of operation, even at high speeds.

As many apparently widely different embodiments of this invention may be made without departing from the spirit and scope thereof, it is to be understood that I do not limit myself to the specific embodiments herein except as defined by the appended claims.

What I claims is:

1. A mowing machine comprising a traction vehicle, mower means connected to the vehicle for vertical movement relative thereto in conformance with ground irregularities, and means for counterbalancing the mower means including a lever, said lever having its central portion pivotally connected to the frame so as to have a long end of said lever movable vertically over said mower means, a link connecting said long portion of said lever and said mower means and a compression spring fitted between a stop on the frame and a point on the short end of said lever closely adjacent its pivotal mounting for yieldably forcing the long end of the lever upwardly thereby to sustain said mower means.

2. The apparatus of claim 1 further characterized in that said link connecting the mower means and lever and said lever are proportioned and located so that said link moves from an inclined toward a vertical position as the spring stress decreases during mower lifting movement.

3. The apparatus of claim 1 further characterized in that the connection between the lever and said compression spring includes a post extending into said compression springs and against a bearing that is connected to that end of the spring into which said post extends.

4. A mowing machine comprising a traction vehicle, having a power unit thereon, a plurality of mower unit means positioned with the mower units in spaced relation around said traction vehicle for cutting overlapping swaths, said mower unit means including a connection to the mower unit for vertical movement of the unit relative thereto while maintained in said overlapping swath cutting relation and a pulley and belt power connection between the traction power unit and each mower unit, each said mower unit including a ground engaging member for partially sustaining the weight of said unit, and spring counterbalance means for sustaining the units thereby to minimize the weight carried by the ground engaging member of each unit, including lever means pivotally mounted on the traction vehicle for each mower unit for movement of the lever means vertically, each said pivotal mounting being located midway between the ends of its associated lever so that a long portion of the lever means overhangs said mower unit means on one side of the pivot and a short portion extends on the opposite side of the pivot, a link from the long portion of each lever means to its mower unit, and heavy spring means connected to the traction vehicle and to the short portion of each lever means closely adjacent its pivotal mounting for forcing the long portion of the lever means in an upward direction.

5. The apparatus of claim 4 further characterized in that one mower unit is positioned in front of the traction vehicle to cut a central swath approximately as wide as the traction vehicle and side mowers are attached to the rear portion of said vehicle, one at each side thereof, said side mowers being mounted upon a sub-frame that is articulated with respect to the traction vehicle, and separate spring counterbalance means is provided for the front unit and for said sub-frame.

6. A mowing machine comprising a traction vehicle, a mower supporting frame connected to said vehicle for vertical translatory movement relative to the vehicle, a mowing unit hingedly connected to said frame and extending outwardly therefrom for pivotal movement about said hinge, said mowing unit being provided with an arm from the unit across the axis of said hinged connection, an inextensible flexible connection from said arm to the traction vehicle having a length so as to be slack when the mowing unit is in extended position, means for lifting the mowing unit to an extent sufficient to take up the slack of the flexible connection whereby the mower supporting frame is then lifted.

7. A wing type articulated multiple mowing unit mowing machine comprising a traction vehicle, a front mower unit positioned in front of the traction vehicle and connected thereto by means of an articulated connection for vertical translatory movement of said unit relative to the traction vehicle, a sub-frame positioned behind the traction vehicle and connected thereto by means of an articulated connection for vertical translatory movement of the sub-frame relative to the traction vehicle, a pair of wing mower units positioned so as to extend outwardly from each side of the sub-frame so as to cut swaths overlapping that cut by the front mowing unit, said wing mower units each being hingedly connected to the sub-frame, each wing mower unit being provided with a projection extending towards the sub-frame and across the axis of the hinged connection of the mower unit, a flexible normally slack inextensible connection from the traction vehicle to each projection, means for elevating each wing mower unit arcuately about its hinged connection, said flexible inextensible connections being of a length such that the slack is taken up and the sub-frame thereby elevated when the wing mower units are elevated arcuately beyond a predetermined angle.

8. In a mowing machine including a traction vehicle, a mower unit positioned so as to extend outwardly at one side of said traction vehicle, said mower unit being hingedly connected to the traction vehicle for arcuate elevating motion about the hinge as a center, the combination comprising a reach arm having one end pivotally connected to the mower unit and having an operator grip handle at its opposite normally free end, a detent on the mower unit for locking the normally free end of the reach arm in place along the top of the mower unit, a protrusion on the traction vehicle positioned so as to be below the pivotal connection of the reach arm to the mower unit when the latter is arcuately elevated whereby the reach arm may be passed over the protrusion and then locked to its detent for holding the mower unit in elevated position against said protrusion.

9. The apparatus of claim 8 further characterized in that the reach arm is linked into an eye bolt on the mower unit, said eye bolt being pivotally mounted on the unit.

10. The apparatus of claim 8 further characterized in that the reach arm is linked into an eye bolt on the mower unit, said eye bolt being pivotally mounted on the unit, and spring means is provided for urging said eye bolt and hence the reach arm pivoted thereon in one direction thereby to hold the reach arm again its detent.

11. In a mowing machine including a traction vehicle having a laterally extending mowing unit hingedly connected thereto for upward swinging arcuate movement, the combination comprising an operator seat and steering handle on said traction vehicle, said mowing unit being provided with a lifting pull rod having one end shaped for gripping by the operator and the other end connected by means of a link to an outer part of the mower unit, said link connection of the rod to the mower unit being aligned and located so as to swing to a position in line with but above the steering handle of the traction vehicle when the mower unit is moved arcuately upwardly, and a detent on the mower unit into which the operator grip end of the pull rod may be detachably locked for restraining said rod against the mower unit when the mower unit is down in operating condition and with the steering handle between the rod and mower unit when the mower unit is raised to transporting condition.

12. In a mowing machine having a steering handle thereon, a sub-frame mounted thereon for vertical and limited sideways tipping movement relative to said mowing machine, a pair of wing mower units, one mounted so as to extend laterally outwardly from each side of the sub-frame and aligned with the steering handle and hingedly connected to the sub-frame for arcuate movement upward and downward about said hinged connection, lifting rods, the outer end of each rod being pivotally linked to the outer end of each mower unit, the inner end of each rod being formed with an operator grip handle, a detent for holding the rods extending along the top of its mower unit when the latter is in operating condition, the link connections of each rod to its mower unit being positioned so as to be above the mower steering handle when the mower unit is elevated whereby each rod may be locked over the steering handle and the rod then locked into its detent for holding its mower unit in elevated transporting position.

13. A mowing machine comprising a traction vehicle, a power shaft thereon, a rotary reel mower unit hingedly connected to the vehicle so as to extend outwardly therefrom with the reel axis in a vertical plane parallel to a vertical plane through said power shaft, a hinge connection between the mower unit and vehicle, said hinge connection being slidable along the axis of the hinge, a pulley on the power shaft and an aligned pulley on the reel shaft, a belt over said pulleys and spring means operating in line with said hinge axis to force the mower unit away from the power shaft in the direction of the hinge axis for maintaining the belt tight in varying angular positions of the mower unit about the hinge axis.

ELMER B. McCARTNEY.

REFERENCES CITED

The following references are of record in the file of this patent:

UNITED STATES PATENTS

| Number | Name | Date |
| --- | --- | --- |
| 1,475,206 | Trolley | Nov. 27, 1923 |
| 1,512,439 | Worthington | Oct. 21, 1924 |
| 1,900,726 | Moyer | Mar. 7, 1933 |
| 1,933,535 | Apel | Nov. 7, 1933 |
| 1,948,484 | Anderson | Feb. 27, 1934 |
| 2,145,467 | Waddell | Jan. 31, 1939 |
| 2,168,706 | George et al. | Aug. 8, 1939 |
| 2,283,269 | Krenzke | May 19, 1942 |
| 2,299,859 | Speiser | Oct. 27, 1942 |